A. P. WOLFE.
TOMATO CORING MACHINE.
APPLICATION FILED FEB. 3, 1912.

1,077,446.

Patented Nov. 4, 1913.
3 SHEETS—SHEET 1.

A. P. WOLFE.
TOMATO CORING MACHINE.
APPLICATION FILED FEB. 3, 1912.
1,077,446.
Patented Nov. 4, 1913.
3 SHEETS—SHEET 2.
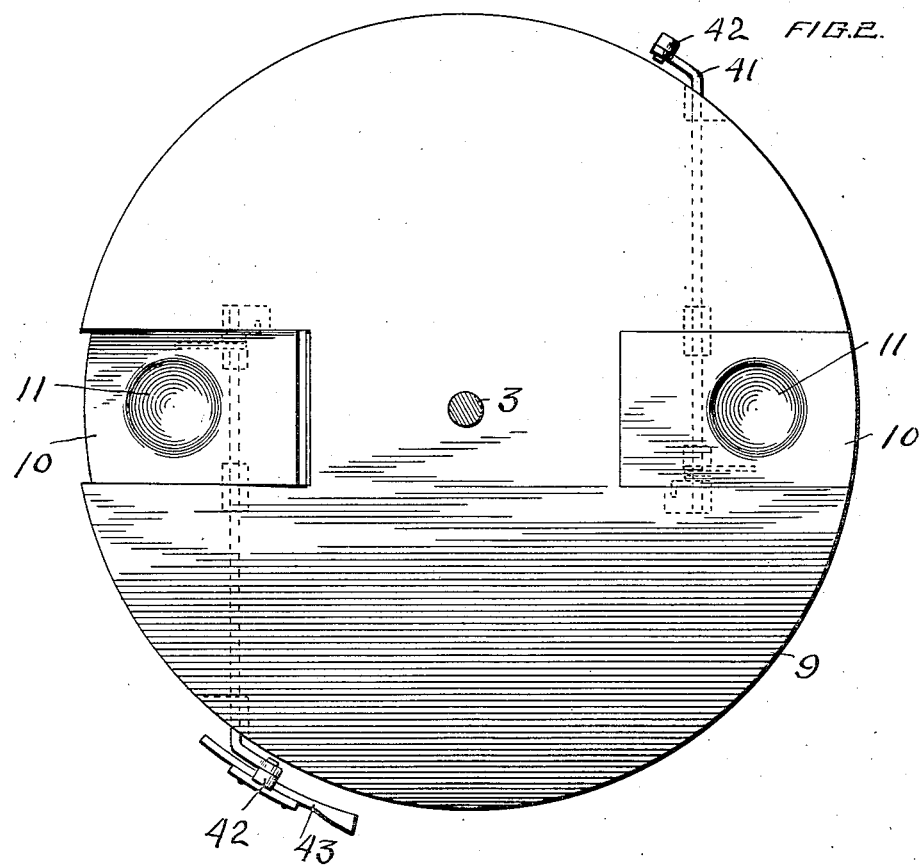
FIG. 2.
FIG. 3.
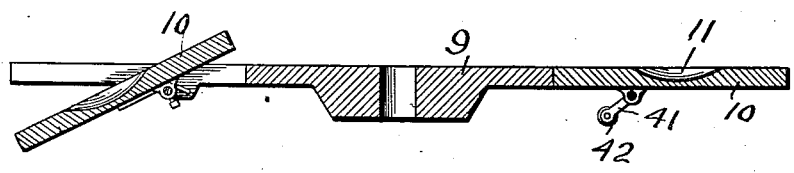
WITNESSES:
INVENTOR
Arthur P. Wolfe
BY
A. P. Greeley
Attorney

A. P. WOLFE.
TOMATO CORING MACHINE.
APPLICATION FILED FEB. 3, 1912.

1,077,446.

Patented Nov. 4, 1913.
3 SHEETS—SHEET 3.

WITNESSES
INVENTOR
Arthur P. Wolfe
BY
A. P. Greeley
Attorney

UNITED STATES PATENT OFFICE.

ARTHUR P. WOLFE, OF VINELAND, NEW JERSEY.

TOMATO-CORING MACHINE.

1,077,446.  Specification of Letters Patent.  Patented Nov. 4, 1913.

Application filed February 3, 1912. Serial No. 675,363.

*To all whom it may concern:*

Be it known that I, ARTHUR P. WOLFE, a citizen of the United States, residing at Vineland, in the county of Cumberland, State of New Jersey, have invented certain new and useful Improvements in Tomato-Coring Machines, of which the following is a description, reference being had to the accompanying drawings, forming a part hereof.

My invention relates to coring devices particularly intended for cutting out and removing the cores of tomatoes, and has for its object to provide means for this purpose which will remove as little as possible of the flesh of the tomato, and will be adapted to cut away only so much of the tomato as may be necessary, whether the tomato be thick or thin, cutting out no more from a relatively thick tomato than from a thin one, and always cutting away sufficient to fully remove the core.

A further object of the invention is to provide a coring device which will carry the cut-out core away from the tomato and will deposit the cored tomato and the core in separate chutes or receptacles.

With these and other objects hereinafter described in view, my invention consists in the construction and combination of elements hereinafter described and particularly pointed out in the claims.

Figure 1:
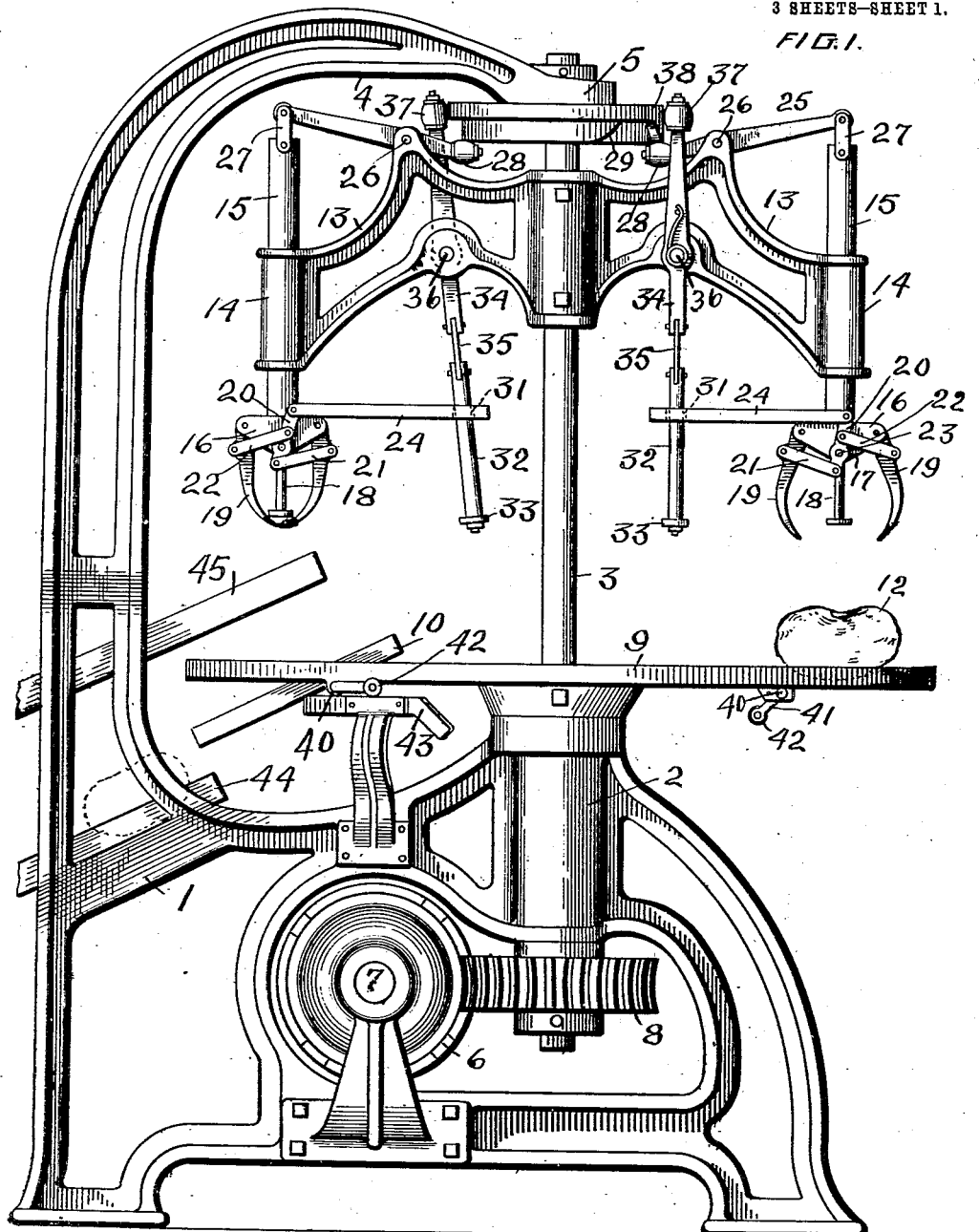
Figure 4:
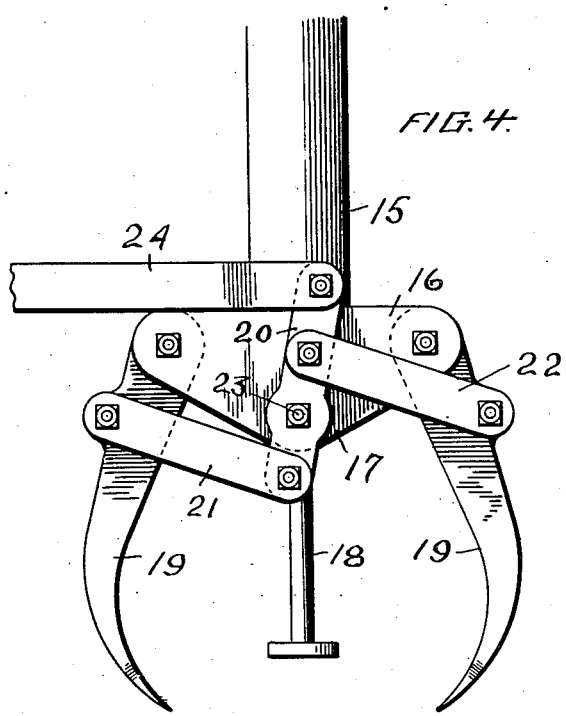
Figure 5:
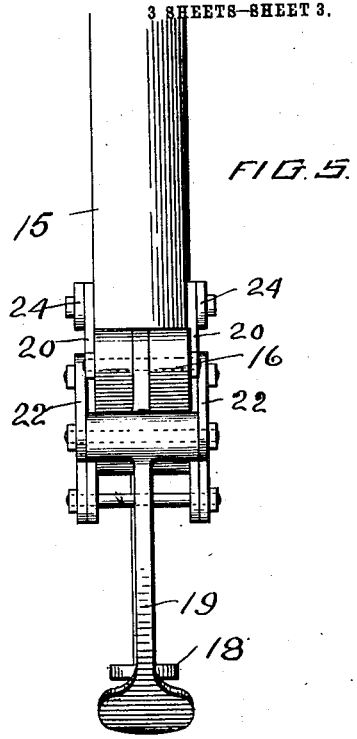
Figure 6:
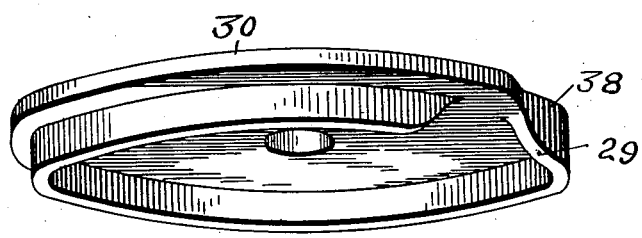
Figure 7:
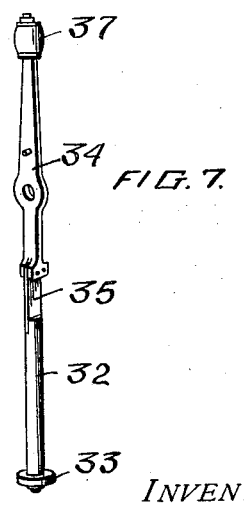

Referring to the drawings—Figure 1 is a side view of a coring machine embodying my invention; Fig. 2 is a plan view of the revolving table on which the tomatoes are supported; Fig. 3 is a vertical sectional view of the revolving table; Fig. 4 is an enlarged side view of the knife support and devices carried by it; Fig. 5 is an edge view of the devices shown in Fig. 4; Fig. 6 is a perspective view of the cam disk by which the knives are operated, and Fig. 7 is a detail view of the lever for operating the knives.

Referring to the drawings, 1 indicates the frame of the machine having a bearing at 2 in its lower portion for a vertical shaft 3, and having an upper arm 4 having a bearing near its ends at 5 for the upper end of the vertical shaft 3. The vertical shaft 3 is arranged to be rotated by any convenient means, as, for instance, the worm 6 on power shaft 7 and worm gear 8 on shaft 3. On the shaft 3 just above the bearing 2 is secured a table 9 having hinged sections 10 cupped on their upper sides to form a bowl 11 adapted to receive and center a tomato 12. This bowl 11 is symmetrical with reference to its center, so that corresponding opposite points are equidistant from the center, and as tomatoes are almost invariably symmetrical with reference to the line passing through the centers of the core and the blossom end, the bowl will cause the center of the core to be in line with the center of the bowl.

Secured on the vertical shaft 3 near its upper end is a pair of oppositely extending arms 13, each having in its end a vertical bearing 14 for a vertically movable rod 15. Each rod 15 carries on its lower end below the bearing 14 a cross head 16 having a central downward extension 17, in which is adjustably secured the upper end of a core rod 18. Pivoted at each end of the cross head 16 is a curved knife 19, the lower ends of these knives being adapted to cut out the core of a tomato when brought together. The lower ends of the knives are arranged in planes below the end of the core rod and are preferably arranged to have their lower edges pass one by the other like the blades of scissors. Pivoted on the downward extension 17, at 23, is a lever 20, and this lever is connected by pivoted links 21, 22 with the knives 19, the link 21 being connected to the lever 20 below its pivot 23, and the link 22 being connected with the lever above its pivot 23. To the upper end of the lever 20 is pivotally connected an operating rod 24.

The rod 15 and its cross head 16 is arranged to be movable up and down by any convenient means, such, for instance, as the means hereinafter described. The center of the rod is arranged in line with the center of the cup or bowl shaped depression 11 in the tiltable section 10 of the table 9. A tomato being in place in the depression 11, and centered as above described, the rod 15 is moved downward until the end of the core rod 18 rests on the hard green center of the core. The operating rod 24 is then moved in a direction toward the shaft 3 and causes the lever 20 to swing on its pivot and through the links 21 and 22 causes the lower ends of the knives 19 to cut or bite out the core. The rod, cross head and knives are then caused to rise, and as the shaft 3 and arms 13 rotate the operating rod 24 is at the proper time caused to move away from the shaft 3, opening the knives and permitting the core to drop into a suitable chute or receptacle.

The means shown for sliding the rod 15 with its cross head and knives up and down comprises a lever 25 pivoted at 26 on the arm 13 and connected at its outer end by a link 27 with the upper end of rod 15. On its inner end the lever 25 carries a roller 28, which is adapted to be engaged by a cam 29 on the under side of a cam disk 30 secured to the under side of the arm 4 concentric with the shaft 3.

The operating rod 24 is slotted at 31 near its inner end, and through this slot extends a rod 32, having a head 33 at its lower end. This rod is carried by a lever 34, being connected to the lower end of the lever by a relatively stiff spring 35. This lever is pivoted at 36 on the arm 13, and at its upper end carries a roller 37, which is in position to be engaged by a cam 38 on the side of the cam disk 30.

The sections 10 of the table 9 are pivoted at 40, so that they normally lie flat in the plane of the fixed portions of the table. They are each provided at their outer ends with an arm 41 carrying a roller 42, which roller is of sufficient weight to normally hold the sections as above mentioned and the frame of the machine is provided at a suitable point with a cam 43, against which the roller 42 strikes, and the section 10 is thereby caused to tilt sufficiently to dislodge the cored tomato and allow it to slide off into the chute 44.

45 is a chute for the cores, into which they drop when the knives 19 are allowed to open after they have cut the core out.

The rod 15, with the cross head 16 and the knives, is constructed of such materials and of such weight that it will drop quickly when the cam 29 releases the roller 28, but is, of course, not sufficiently heavy to cause the core rod 18 to injure the tomato. The core rod, as its lower end comes in contact with the core or stem end of the tomato, stops the further descent of the cross head and knives, and the knives are then operated to cut out the core. The amount of material cut out by the knives will be always the same, whether the tomato operated on be thick or thin, and is only varied by adjusting the core rod 18 up or down.

It will, of course, be understood that I do not desire to be limited to the particular construction shown or to the particular means shown for operating the knives, as they may be varied without departing from the spirit of the invention.

It will also be understood that while primarily intended for coring tomatoes, my invention may be used for other fruit or vegetables.

Having thus described my invention, what I claim is:

1. Means for coring tomatoes, comprising means for supporting and centering the tomatoes, knives adapted to enter the tomato on opposite sides of the core, a support for said knives movable toward and away from the tomato, means carried by said support to contact with the tomato to limit the movement of the support toward the tomato and means for operating the knives to cause them to core the tomato.

2. Means for coring tomatoes, comprising means for supporting and centering the tomato with its core end up, knives adapted to enter the tomato on opposite sides of the core, a support for said knives, movable toward and away from the tomato, a rod carried by said support adapted to bear against the tomato core to thereby correctly fix the position of the knives with relation to the tomato, means for operating the knives to core the tomato.

3. A machine for coring tomatoes, consisting of a supporting table for the tomatoes, supporting means above said table for coring knives, said knife-carrying support movable toward and away from said tomato carrying table, a blunt rod attached to said knife carrying support adapted to limit the downward movement of said support by bearing against the tomato core to thereby properly fix the knives in relation to the tomato, means for actuating the knives to cause them to core the tomato.

4. A machine for coring tomatoes, consisting of a circular table, a movable support for the tomatoes attached to and mounted flush with said table, said table fastened securely to and rotated by a vertical shaft, supporting means for knives securely attached to and rotated with the above mentioned shaft, coring knives attached to said support, means for bringing the knives into proper relation with the tomato depending on the size of the latter, and means for operating the knives to cause them to core the tomato.

5. A machine for coring tomatoes, consisting of a circular table, a movable support for the tomato, adapted to discharge the latter after the completion of the coring, a support for the coring knives mounted movable in guides, said guides securely attached to a vertical shaft upon which shaft is also mounted the said circular table, a cam for moving the knife support into proper position for coring, a cam operating the knives to thereby core the tomatoes.

6. A machine for coring tomatoes, comprising means for supporting and centering the tomato, a vertically supported shaft, knives pivotally connected to said shaft, a lever pivoted to said shaft intermediate and linked to said knives, an arm linked to said lever and means for actuating the arm to thereby open and close the said knives.

7. A machine for coring tomatoes, comprising means for supporting and centering the tomato, a vertically supported shaft, a cross-head at the lower end of said shaft, knives pivotally connected to said cross-head, a lever also pivoted to said cross-head immediate and linked to said knives so that the one knife will travel through a greater arc than the other and thereby contact with the inner surface thereof, an arm connected to said lever and means for actuating said arm.

This specification signed and witnessed this first day of February A. D. 1912.

ARTHUR P. WOLFE.

In the presence of—
THOMAS TUSSO,
HENRY S. ALVORD.